(12) United States Patent
Quiring et al.

(10) Patent No.: US 8,631,764 B2
(45) Date of Patent: Jan. 21, 2014

(54) ANIMAL FEEDING DEVICES AND METHODS

(75) Inventors: Tod K. Quiring, Windom, MN (US);
Gary H. Quiring, Windom, MN (US);
Brent G. Quiring, Windom, MN (US);
Nathan M. Stieren, Windom, MN (US)

(73) Assignee: BGHA, Inc., Windom, MN (US)

( * ) Notice: Subject to any disclaimer, the term of this patent is extended or adjusted under 35 U.S.C. 154(b) by 184 days.

(21) Appl. No.: 12/899,989

(22) Filed: Oct. 7, 2010

(65) Prior Publication Data

US 2012/0085289 A1    Apr. 12, 2012

(51) Int. Cl.
*A01K 39/014* (2006.01)
*A01K 5/02* (2006.01)

(52) U.S. Cl.
USPC ..................................... 119/57.91; 119/57.92

(58) Field of Classification Search
USPC ........... 119/57.1, 57.91, 57.92; 239/650, 668, 239/681, 684, 687; 111/11; 56/16.8
See application file for complete search history.

(56) References Cited

U.S. PATENT DOCUMENTS

| | | |
|---|---|---|
| 321,703 A | 7/1885 | Foster |
| 396,251 A | 1/1889 | Adamson |
| 1,239,404 A | 9/1917 | Knoll |
| 1,355,399 A | 10/1920 | Kelley |
| 2,723,860 A | 11/1955 | Weeks |
| 2,758,842 A * | 8/1956 | Burroff .......................... 239/687 |
| 2,934,037 A | 4/1960 | Ernest |
| 3,195,508 A | 7/1965 | Lehman et al. |
| 3,547,081 A | 12/1970 | Geerlings |
| 3,717,127 A * | 2/1973 | Porterfield .................... 119/57.7 |
| 3,742,913 A | 7/1973 | Crippen |
| 3,949,909 A | 4/1976 | Sterner |
| 4,027,627 A | 6/1977 | Fillion |
| 4,565,159 A | 1/1986 | Sweeney |
| 4,580,730 A | 4/1986 | Amerine |
| 4,986,220 A | 1/1991 | Reneau et al. |
| 5,143,289 A | 9/1992 | Gresham et al. |
| 5,237,803 A * | 8/1993 | Domingue, Jr. ............... 56/16.8 |
| 5,333,572 A * | 8/1994 | Nutt ........................... 119/57.91 |
| 5,732,652 A * | 3/1998 | Allen ......................... 119/57.91 |
| 5,820,035 A | 10/1998 | Johnson et al. |
| 5,862,777 A | 1/1999 | Sweeney |
| 5,906,174 A * | 5/1999 | Muldoon ......................... 119/54 |
| 6,047,909 A | 4/2000 | Simpson |
| 6,138,927 A * | 10/2000 | Spear et al. .................... 239/666 |
| 6,637,678 B2 | 10/2003 | Wyne |
| 6,763,781 B1 | 7/2004 | Norrell |
| 7,222,583 B2 | 5/2007 | Foster et al. |
| 7,252,049 B2 | 8/2007 | Ginsberg |
| 7,404,376 B2 * | 7/2008 | Hernandez ................. 119/57.91 |
| 7,717,063 B2 | 5/2010 | Chang et al. |
| 8,015,945 B1 * | 9/2011 | Traywick et al. ............ 119/57.1 |
| 8,016,169 B2 * | 9/2011 | Blandini et al. .............. 222/626 |
| 2009/0241841 A1 | 10/2009 | Dollar, Jr. et al. |

(Continued)

*Primary Examiner* — Son T Nguyen
*Assistant Examiner* — Kathleen Alker
(74) *Attorney, Agent, or Firm* — Kagan Binder, PLLC

(57) ABSTRACT

Animal feeders that are resistant to depletion of the feed hopper due to undesired feeding by small birds and small animals as well as related methods are described. Exemplary feeders preferably comprise an enclosure surrounding a feed distributor and that comprises first and second portions. The enclosure prevents small birds and small animals from accessing the feed distributor and includes a gap through which the feed distributor directs feed. Moreover, the present invention provides animal feeders that eliminate the potential for feed to jam the feed distributor thereby allowing smaller, more economical motors to be used.

19 Claims, 5 Drawing Sheets

(56) References Cited

U.S. PATENT DOCUMENTS

| | | |
|---|---|---|
| 2009/0241845 A1 | 10/2009 | Croft |
| 2009/0241846 A1 | 10/2009 | Dollar, Jr. et al. |
| 2010/0095895 A1* | 4/2010 | Laliberta ...................... 119/56.1 |
| 2010/0132616 A1 | 6/2010 | Rieger |
| 2011/0036298 A1 | 2/2011 | Dollar, Jr. et al. |

* cited by examiner

ANIMAL FEEDING DEVICES AND METHODS

TECHNICAL FIELD

The present invention relates generally to animal feeding devices and related methods.

BACKGROUND

Farmers, photographers, and hunters commonly use game feeders, as several examples. Hunters often use animal feeders to distribute feed grains such as corn and the like to attract and retain game animals such as deer and turkey, for example. One common type of animal feeder includes a feed hopper having an outlet, a feed distributor located directly under the feed hopper outlet, and a controller for periodically energizing an electric motor for spinning the feed distributor.

Typical feed distributors include a flat plate having a suitable shape, often square, rectangular, or round. One type of feed distributor includes a round, flat plate having two or more small L-shaped vanes that function to propel the feed outwardly and away from the feed distributor when spinning. This feed distributor also includes an annular plate attached to the top of the vanes to direct the feed outwardly in a horizontal plane so the feed is not undesirably directed upwardly where the feed could potentially ricochet off the bottom of the feed hopper. Another type of feed distributor includes a rectangular tray having swinging gates at opposite ends of the tray that are closed when the feed distributor is not spinning. When the feed distributor is spinning, centrifugal force opens the swinging gates thereby allowing feed to be propelled outwardly away from the distributor.

In use, feed drops from the feed hopper outlet onto the feed distributor. When the motor turns, feed on the feed distributor is centrifugally thrown outwardly and replaced by feed falling from the feed hopper. The feed hopper outlet is positioned close to the feed distributor so feed does not fall off the side of the feed distributor when the feed distributor is not rotating. Specifically, when the feed distributor is not rotating, feed falling from the feed hopper outlet builds up on the feed distributor and effectively clogs up the flow of feed from the feed hopper outlet to the feed distributor. Accordingly, because the flow of feed from the feed hopper stops when the feed distributor is not spinning there is no closing device for the feed hopper outlet.

A common shortcoming of known animal feeders relates to the ability of small birds and small animals such as squirrels and raccoons to learn feed directly from the feed distributor plate when the motor is stopped, despite the fact that the feed hopper and the distributor are elevated substantially off the ground. When feed is taken from the feed distributor, more feed falls out of the feed hopper outlet onto the feed distributor. Accordingly, birds and animals not desired to eat the feed can consume large portions of feed thereby depleting the feed hopper.

Another common shortcoming of known animal feeders relates to the build up of feed and jamming of the feed distributor or similar moving parts. Most animal feeders include a horizontal spinning plate that functions to distribute feed that falls onto the plate from a feed supply. In these animal feeders, it is possible for feed to build up and jam rotation of the spinning plate. Accordingly, feed distributors utilize motors with sufficient power to crush the feed rather than allow the feed to jam the spinning plate.

SUMMARY

The present invention provides animal feeders that are resistant to depletion of the feed hopper due to undesired feeding by small birds and small animals as well as related methods. Exemplary feeders preferably comprise an enclosure surrounding a feed distributor and that comprises first and second portions. The enclosure prevents small birds and small animals from accessing the feed distributor and includes a gap through which the feed distributor directs feed. Moreover, the present invention provides animal feeders that eliminate the potential for feed to jam the feed distributor thereby allowing smaller, more economical motors to be used.

In an exemplary aspect of the present invention an animal feeder is provided. The animal feeder can be operatively connected to a feed hopper and supported by a frame. The animal feeder preferably comprises an enclosure at least partially enclosing a feed distributor. The enclosure preferably comprises first and second portions. The first and second portions of the enclosure each preferably comprise an edge provided around at least a portion of the perimeter of each of the first and second portions of the enclosure. The edge of the first portion of the enclosure is preferably spaced from the edge of the second portion of the enclosure to at least partially define a gap. A motor or other drive device is preferably operatively connected to the feed distributor to rotate the feed distributor on demand. The feed distributor is preferably configured to propel feed provided by the hopper through the gap when the feed distributor is rotated.

In another exemplary aspect of the present invention an animal feeder is provided. The animal feeder can be operatively connected to a feed hopper and supported by a frame. The animal feeder preferably comprises an enclosure at least partially enclosing a feed distributor. The enclosure preferably comprises a first portion having a conical portion and a flange provided around at least a portion of the perimeter of the first portion and projecting therefrom. The enclosure also preferably comprises a second portion having a conical portion and a flange provided around at least a portion of the perimeter of the second portion and projecting therefrom. The flange of the first portion is preferably spaced from the flange of the second portion to at least partially define a gap. A motor or other drive device is preferably operatively connected to the feed distributor to rotate the feed distributor on demand. The feed distributor is preferably configured to propel feed provided by the hopper through the gap when the feed distributor is rotated.

In another exemplary aspect of the present invention a method of distributing feed to animals is provided. The method preferably comprises providing feed to a hopper; directing feed from the hopper to a feed distributor at least partially enclosed by an enclosure, the enclosure comprising first and second portions, the first and second portions of the enclosure each comprising a flange provided around at least a portion of the perimeter of each of the first and second portions of the enclosure projecting therefrom, the flange of the first portion of the enclosure spaced from the flange of the second portion of the enclosure to at least partially define a gap; and rotating the feed distributor on demand with a motor thereby propelling the feed through at least a portion of the gap.

In yet another exemplary aspect of the present invention a method of distributing feed to animals is provided. The method preferably comprises providing the animal feeder as described herein; providing feed to the hopper; and rotating the feed distributor on demand with the motor thereby propelling the feed through at least a portion of the gap.

BRIEF DESCRIPTION OF THE DRAWINGS

The accompanying drawings, which are incorporated in and constitute a part of this disclosure, illustrate several aspects of the present invention and together with description of the exemplary embodiments serve to explain the principles of the present invention. A brief description of the drawings is as follows.

DETAILED DESCRIPTION

The exemplary embodiments of the present invention described herein are not intended to be exhaustive or to limit the present invention to the precise forms disclosed in the following detailed description. Rather the exemplary embodiments described herein are chosen and described so those skilled in the art can appreciate and understand the principles and practices of the present invention.

Figure 1:
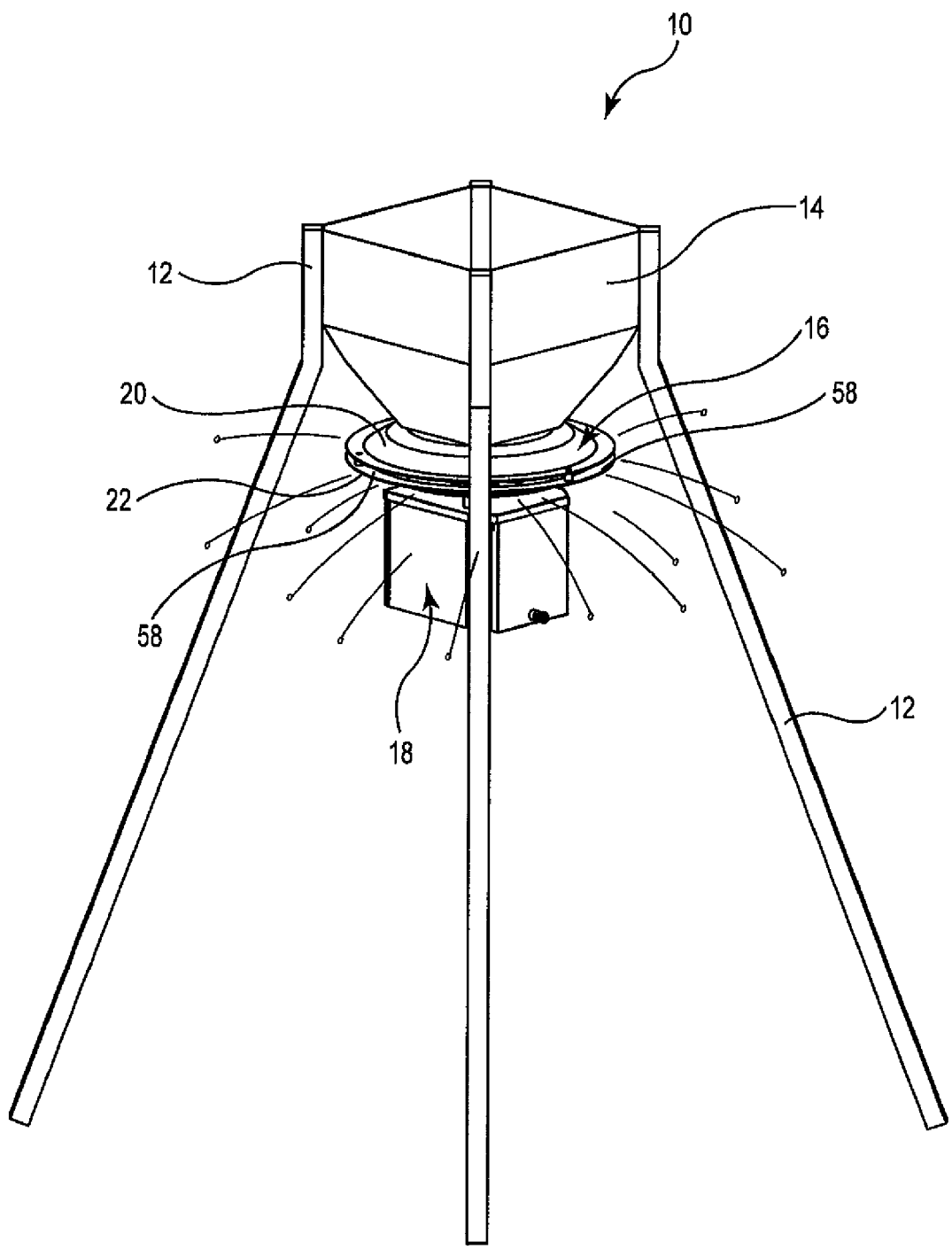
FIG. 1 is a perspective view of an exemplary animal feeder and showing in particular a hopper, support stand, enclosure, and drive and control unit in accordance with the present invention.

With reference to FIG. 1, exemplary animal feeder 10 in accordance with the present invention is illustrated. Animal feeder 10, as shown in FIG. 1, is supported by exemplary support frame 12. Support frame 12 is preferably operatively attached to hopper 14 of animal feeder 10, as shown. In addition to hopper 14, animal feeder 10 preferably includes enclosure 16 and drive and control unit 18, which are both described in more detail below. Hunters that desire to attract game animals to a predetermined location often use animal feeder 10 to provide feed for attracting desired game animals. In use, enclosure 16 propels feed provided by hopper 14 and spreads the feed onto the ground surrounding animal feeder 10 on a predetermined schedule. Accordingly, game animals are attracted to the feed and will typically spend more time near the location of animal feeder 10 because of the distributed feed.

It is desirable to elevate animal feeder 10 above ground level in use. Generally, a higher elevation provides a greater area over which feed will be spread. Preferably, animal feeder 10 is provided at an elevation where animal feeder 10 can be accessed such as for maintenance and refilling, for example. Support frame 12 positions exemplary animal feeder 10 at a desired elevation above ground level. Any desired supporting structure can be used and can be attached to any of hopper 14, enclosure 16, and drive and control unit 18. Hanging animal feeder 10 from a tree limb, pole, building, vehicle, or other similar support structure can also be used to support animal feeder 10 at a desired elevation relative to ground level.

Figure 2:
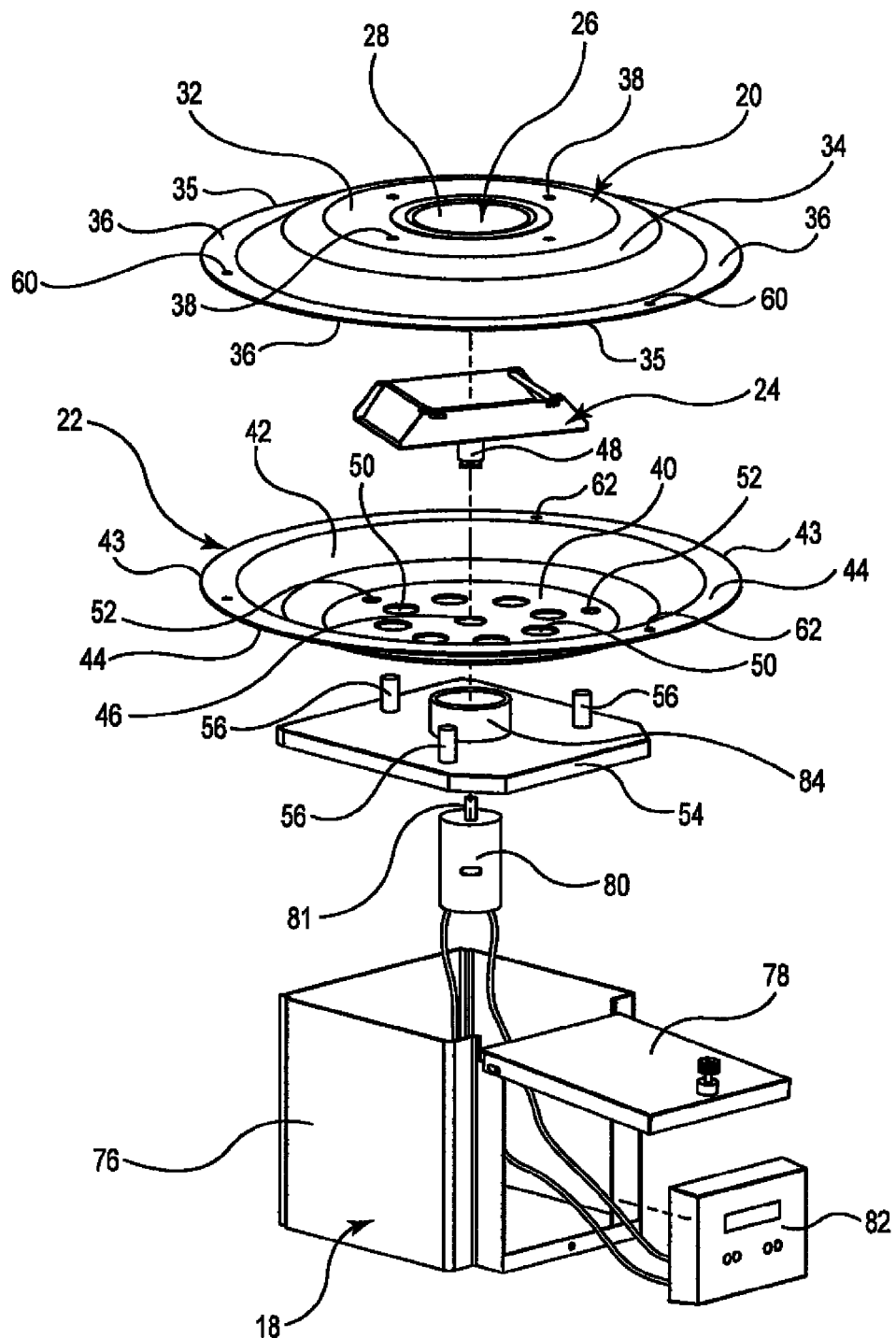
FIG. 2 is a perspective exploded view of the enclosure and drive and control unit of the exemplary animal feeder shown in FIG. 1 and showing in particular a first portion, second portion, and feed distributor of the enclosure in accordance with the present invention.

With reference to FIG. 2, an exploded view of enclosure 16 and drive and control unit 18 is shown. Generally, enclosure 16 comprises first portion 20, second portion 22, and feed distributor 24. Referring to both FIGS. 2 and 3, first portion 20 preferably includes conical chute 26 having outside opening 28 and inside opening 30. Conical chute 26 is designed and functions to direct feed provided by hopper 14 to feed distributor 24. Subsequent rotation of feed distributor 24 functions to distribute feed to an area surrounding animal feeder 10. Preferably, inside opening 30 is sized to define a desired feed flow. The conical shape of chute 26 is exemplary and any structure that can function to deliver feed from hopper 14 to feed distributor 24 can be used.

Figure 3:
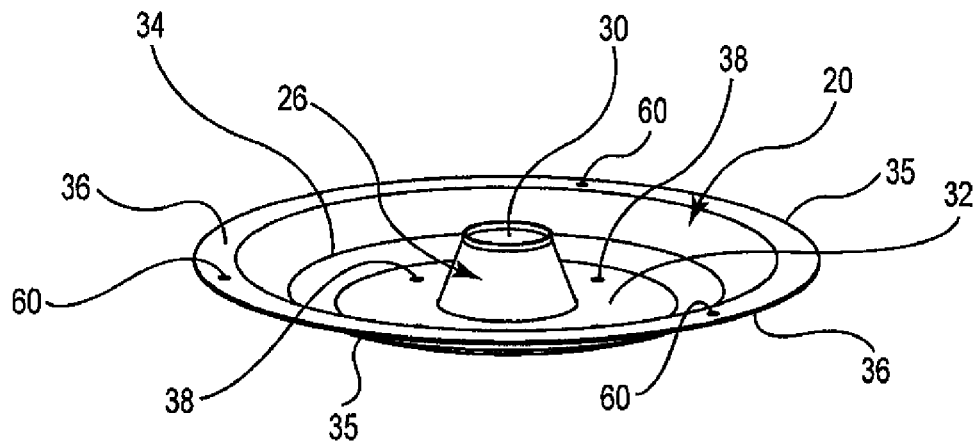
FIG. 3 is a perspective view of the first portion of the enclosure shown in FIG. 2 in accordance with the present invention.

First portion 20, as shown in FIGS. 2 and 3, comprises flat portion 32, conical portion 34, and optional flange 36. The conical shape of exemplary conical portion 34 preferably functions to help guide or otherwise direct feed from feed distributor 24 to gap 58 during operation of animal feeder 10. The shape of conical portion 34 including the overall size and angle are preferably determined empirically. Moreover, conical portion 34 is preferably designed to provide clearance between conical portion 34 and feed distributor 24. Such clearance is preferably provided to minimize the potential for feed to build up and jam feed distributor 24 when rotating.

In the exemplary animal feeder illustrated in FIG. 1 hopper 14 is illustrated. comprises an enclosure, preferably including a lid (not shown), and functions to hold and store a predetermined amount of feed. As shown, hopper 14 is attached to first portion 20 of enclosure 16. Accordingly, flat portion 32 preferably functions to mount hopper 14 to a corresponding flat portion or other suitable structure (not shown) of enclosure 16. Flat portion 32 thus preferably includes openings 38 to secure hopper 14 to enclosure 16 with appropriate fasteners (not shown) or the like. Any technique can be used to position or otherwise secure hopper 14 to enclosure 16 including, removable or permanent, fastening, attaching, and securing techniques, for example. Suitable exemplary techniques include conventional fastening such as with threaded fasteners and rivets as well as crimping, brazing, soldering, welding, and combinations thereof, for example. Additionally, any suitable structural features can be used to mount hopper 14 to enclosure 16, as use of corresponding flat portions to mount hopper 14 to enclosure 16 is exemplary and not required. For example, hopper 14 can be mounted to enclosure 16 using any of standoffs, brackets, supporting structure, and the like. Moreover, hopper 14 can be spaced from or remote from enclosure 16. Accordingly, animal feeder 10 can include any of a chute, hose, and trough including mechanized devices to provide feed from hopper 14 to enclosure 16.

Figure 4:
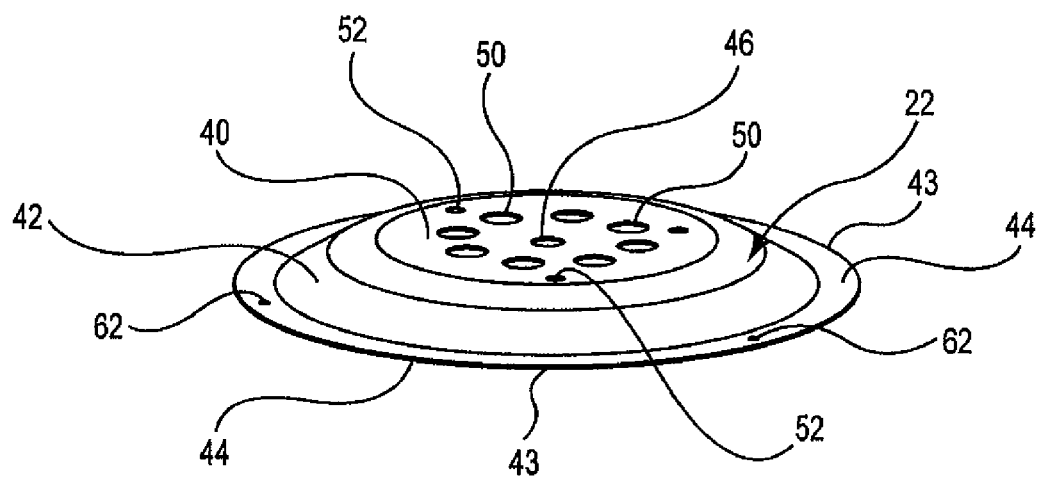
FIG. 4 is a perspective view of the second portion of the enclosure shown in FIG. 2 in accordance with the present invention.

Second portion 22, as shown in FIGS. 2 and 4, comprises flat portion 40, conical portion 42, and optional flange 44. Flat portion 40 of second portion 22 preferably comprises opening 46 for coupling sleeve 48 of feed distributor 24 with shaft 81 of motor 80. Flat portion 40, of second portion 22 also preferably comprises openings 50 that function to allow one or both of moisture and feed to exit enclosure 16 and further allow for ventilation of enclosure 16. In particular, moisture as any of humidity, rain, and snow may undesirably enter enclosure 16. Openings 50 thus allow such moisture to escape. Additionally, feed may spill from feed distributor 24 and openings 50 allow such feed to exit enclosure 16 to prevent feed from undesirably accumulating in enclosure 16.

Referring to FIG. 2 in particular, flat portion 40 of second portion 22 also preferably comprises openings 52. Openings 52 function to secure second portion 22 to plate 54 of drive and control unit 18. As shown, plate 54 includes standoffs 56 that align with and provide attachment locations for plate 54 using appropriate fasteners (not shown) or the like. Preferably, standoffs 56 are welded to plate 54 and each include a threaded opening for receiving a threaded fastener. Any technique can be used to position or otherwise secure second portion 22 to plate 54 including, removable or permanent, fastening, attaching, and securing techniques including use of standoffs or other similarly functioning structure. Suitable exemplary techniques include conventional fastening such as with threaded fasteners and rivets as well as crimping, brazing, soldering, welding, and combinations thereof, for example.

As shown in FIG. 1, first portion 20 and second portion 22 of enclosure 16 are spaced apart to provide gap 58 between circumferential edge 35 of flange 36 of first portion 20 and circumferential edge 43 of flange 44 of second portion 22. First portion 20 preferably includes openings 60 and second portion 22 preferably includes openings 62. Openings 60 and 62, of first and second portions 20 and 22, respectively, function with standoffs 56 and appropriate fasteners (not shown) to secure first portion 20 relative to second portion 22 to define gap 58 in accordance with the present invention. Any technique can be used to position first and second portions 20 and 22, respectively, relative to each other to define gap 58 including spacers and support structures such as tabs or the like as well as conventional fastening such as with threaded fasteners, riveting, brazing, and welding, for example.

Flanges 36 and 44 at least partially relate to defining gap 58 and as shown are provided as parallel extensions of conical portions 34 and 42. Flanges 36 and 44 can be provided at any desired angle such as to provide a converging or diverging space between flanges 36 and 44. Flanges 36 and 44 may have the same or may have different angles. Gap 58 is preferably determined by considering factors such as the area over which feed is desired to be spread, the type of feed distributor used, the shape and size of first and second portions 20 and 22 of enclosure 16, the distance between feed distributor 24 and gap 58, and the types of animals desired to be restricted from accessing feed within enclosure 16. Preferably, gap 58 is determined empirically. Accordingly, as gap 58 increases the area of feed coverage also increases. However, as gap 58 increases undesired animals might be able to access feed within enclosure 16. Spacing feed distributor 24 further away from gap 58 can help to prevent undesired animals from accessing feed within enclosure 16 but may potentially decrease the area of feed coverage. Preferably, the above noted the exemplary factors are empirically balanced to achieve the desired area of coverage and resistance to access by undesired animals.

Figure 5:
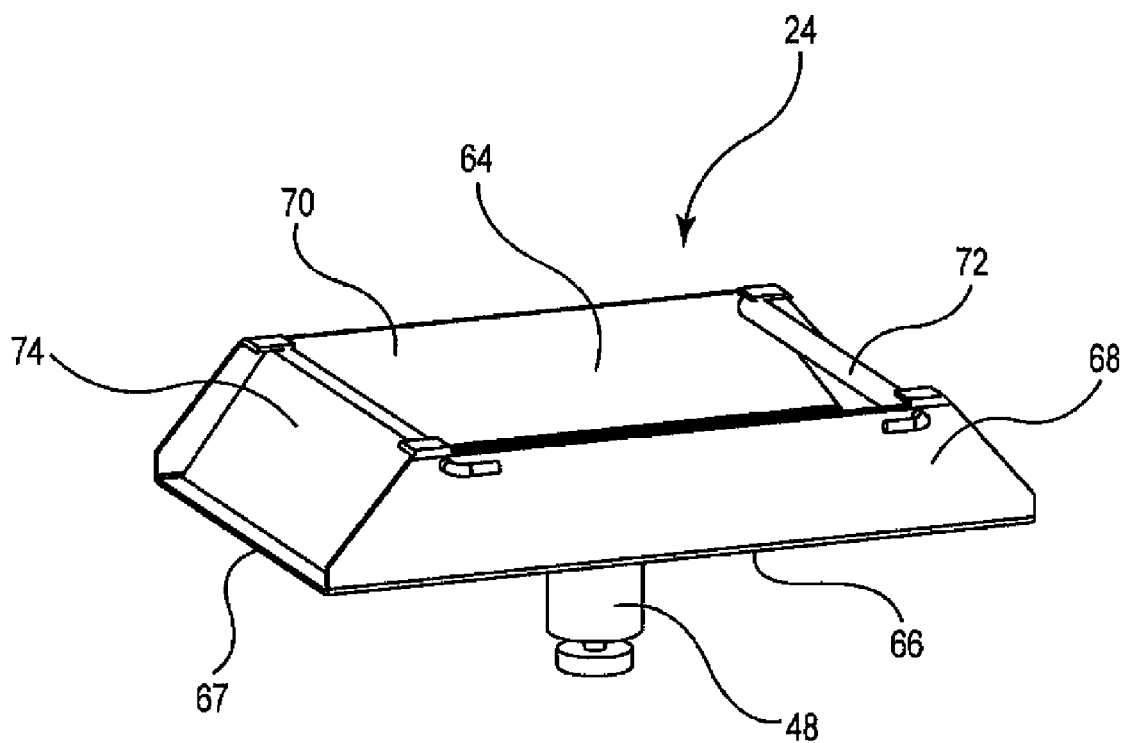
FIG. 5 is a perspective view of the feed distributor shown in FIG. 2.

In an exemplary embodiment, first and second portions 20 and 22 of enclosure 16 preferably have an outside diameter of about 12 to 14 inches and a height of about 0.75 to 2 inches. If used, flanges 36 and 44 preferably protrude from first and second portions 20 and 22, respectively, by about 1 inch. Flanges 36 and 44 can be provided at any desired angle. Regarding the shape of first and second portions 20 and 22 of enclosure 16, the angle of the conical wall is preferably about 30 to 40°. Preferably, the distance from the outside diameter of enclosure 16 to edge 67 of feed distributor 24 is about 3 to 5 inches. Additionally, gap 58 is preferably about 0.25 to 1 inch. Further, outside opening 28 of conical chute 26 preferably has a diameter of about 2.5 to 3.5 inches. Inside opening 30 of conical chute 26 preferably has a diameter of about 1.5 to 2 inches. In addition, feed distributor 24 has a width of about 2.5 to 3.5 inches and a length of about 4.5 to 5.5 inches. Animal feeder 10 is preferably formed from metal such as conventional steel or the like and is painted or otherwise treated for corrosion resistance. Any desired appropriate materials can be used including non-metals such as plastic and fiberglass, for example With reference to FIG. 5, exemplary feed distributor 24 is illustrated in greater detail. Feed distributor 24, as illustrated, comprises inside region 64. Region 64 preferably includes and is preferably defined by plate 66 (operatively attached to coupling sleeve 48), sides 68 and 70, and swinging gates 72 and 74. Opening 30 of chute 26 is positioned relative to region 64 so feed from inside opening 30 of chute 26 preferably creates a feed pile that effectively blocks chute 26 and prevents additional feed from accumulating in region 64 of feed distributor 24 when feed distributor 24 is not rotating. When feed distributor 24 is rotating in use, centrifugal force both opens gates 72 and 74 and directs feed provided in region 64 through gap 58. Additionally, gates 72 and 74 as well as sides 68 and 70 help to prevent feed from spilling from feed distributor 24 especially when animal feeder 10 is suspended from a tree or the like and swinging because of wind. It is noted that feed distributor 24 is exemplary and suitable alternates include any structure, device, or mechanism functionally capable of directing feed through gap 58 in accordance with the present invention.

Further referring to FIG. 2, drive and control unit 18 preferably comprises housing 76 having plate 54 and access door 78 and that is preferably designed in accordance with the environment in which animal feeder 10 will be used. Housing 76 preferably provides an enclosure for motor 80, motor controller 82, and a power source (not shown). Motor 80 includes shaft 81 that is configured to operatively mate with coupling sleeve 48 of feed distributor 24 and preferably uses conventional threaded fasteners such as such set screws or the like to provide a secure coupling. Any desired coupling device can be used to provide a functional coupling between feed distributor 24 and shaft 81 of motor 80. Moreover, speed or torque conversion devices can be used such as transmission, gearboxes, and the like. Motor 80 preferably slides into sleeve 84, which is preferably welded or otherwise attached to plate 54. Preferably, motor 80 is held in place by using fasteners to attach motor 80 to flat portion 40 of second portion 22. In an exemplary embodiment of animal feeder 10, motor 80 comprises a 12-volt DC motor. Any attachment method can be used such as described herein and as conventionally known.

Motor controller 82 preferably comprises a device capable of controlling any desired parameters of motor 80. Motor controller 82 also preferably functions to start and stop motor 80 on demand and according to a predetermined schedule. For example, conventional programmable logic controllers or the like can be used.

Drive and control unit 18 also preferably includes a suitable power source (not shown). Exemplary power sources include a battery, a solar cell, a generator, and a line source attached to a power grid such as an inside or outside receptacle of a dwelling or other powered structure. A power source is preferably specified based on the specification of the motor that is used.

Figure 6:
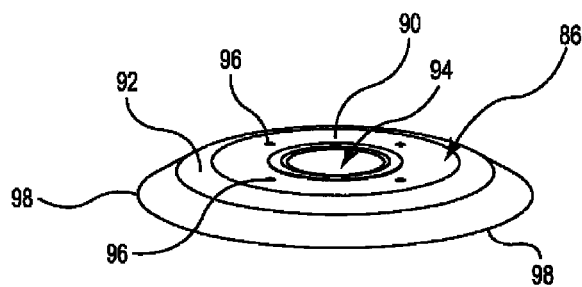
FIG. 6 is a perspective view of an exemplary alternative configuration of the first portion of the enclosure shown in FIG. 2 in accordance with the present invention.
Figure 7:
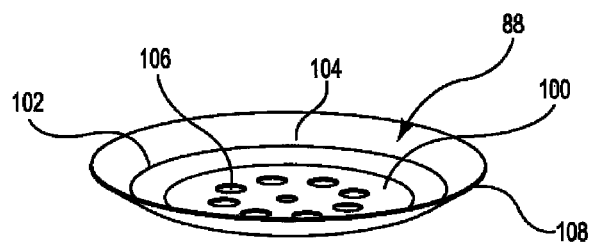
FIG. 7 is a perspective view of an exemplary alternative configuration of the second portion of the enclosure shown in FIG. 2 in accordance with the present invention.

As noted above, flanges 36 and 44 of first and second portions, 20 and 22, respectively, are optional. FIGS. 6 and 7 illustrate alternate first and second portions 86 and 88, respectively. First portion 86, as illustrated, preferably comprises flat portion 90, conical portion 92, conical chute 94, openings 96, and circumferential edge 98. Likewise, second portion 88, as illustrated, preferably comprises flat portion 100, conical portion 102, conical chute 104, openings 106, and circumferential edge 108. When first and second portions, 86 and 88, respectively, are spaced apart and provide an enclosure as described above and in accordance with the present invention, a gap is provided through which feed can be distributed to the area around the enclosure comprising first and second portions 86 and 88, respectively. First and second portions, 86 and 88, can be positioned relative to each other using any desired structure including standoffs, fasteners, and the like.

The present invention has now been described with reference to several exemplary embodiments thereof. The entire disclosure of any patent or patent application identified herein is hereby incorporated by reference for all purposes. The foregoing disclosure has been provided for clarity of understanding by those skilled in the art. No unnecessary limitations should be taken from the foregoing disclosure. It will be apparent to those skilled in the art that changes can be made in the exemplary embodiments described herein without departing from the scope of the present invention. Thus, the scope of the present invention should not be limited to the exemplary structures and methods described herein, but only by the structures and methods described by the language of the claims and the equivalents of those claimed structures and methods.

What is claimed is:

1. An animal feeder that can be operatively connected to a feed hopper and supported by a frame, the animal feeder comprising:
    a feed distributor having a top surface and a bottom surface;
    an enclosure enclosing the feed distributor that is operatively supported to be rotatable relative to the enclosure, the enclosure comprising stationary first and second portions that fully cover the top surface and the bottom surface, respectively, of the feed distributor, the first and second portions of the enclosure each comprising an edge provided along the perimeter of each of the first and second portions of the enclosure, the edge of the first portion of the enclosure spaced from the edge of the second portion of the enclosure defining a gap that extends substantially all of the way along the perimeter of each of the first and second portions of the enclosure;
    a motor operatively connected to the feed distributor to rotate the feed distributor relative to the first and second portions of the enclosure on demand, the feed distributor configured to propel feed as can be provided from the hopper through the gap in substantially all directions from the enclosure when the feed distributor is rotated; and
    a plate secured to the bottom of the second portion for supporting the motor.

2. The animal feeder of claim 1, wherein the first portion of the enclosure comprises a conical portion.

3. The animal feeder of claim 2, wherein the first portion of the enclosure comprises a chute for providing feed from the hopper to the feed distributor.

4. The animal feeder of claim 1, wherein the second portion of the enclosure comprises a conical portion.

5. The animal feeder of claim 4, wherein the second portion of the enclosure comprises an opening for a shaft connecting the motor and the feed distributor.

6. The animal feeder of claim 1, wherein the first and second portions of the enclosure each comprises a flange providing an edge that extends along the perimeter of each of the first and second portions of the enclosure.

7. The animal feeder of claim 6, wherein the flange of the first portion of the enclosure comprises an annular flange.

8. The animal feeder of claim 6, wherein the flange of the second portion of the enclosure comprises an annular flange.

9. The animal feeder of claim 1, wherein the feed distributor comprises a plate having a first swinging gate at a first end of the plate and a second swinging gate at a second end of the plate.

10. The animal feeder of claim 9, wherein at least one of the first and second ends of the plate of the feed distributor is spaced from the outside diameter of the flange of the first portion of the enclosure by between 3 and 5 inches.

11. The animal feeder of claim 9, wherein at least one of the first and second ends of the plate of the feed distributor is spaced from the outside diameter of the first portion of the enclosure by a distance sufficient to prevent animals from reaching the feed distributor.

12. An animal feeder that can be operatively connected to a feed hopper and supported by a frame, the animal feeder comprising:
    a feed distributor having a top surface and a bottom surface;
    an enclosure enclosing the feed distributor that is operatively supported to be rotatable relative to the enclosure, the enclosure comprising stationary first and second portions that fully cover the top surface and the bottom surface, respectively, of the feed distributor, the first portion having a conical portion surrounded by a flange that projects from the conical portion and provides an edge along the perimeter of the first portion and the second portion having a conical portion surrounded by a flange that projects from the conical portion and provides an edge along the perimeter of the second portion, the flange of the first portion spaced from the flange of the second portion defining a gap that extends substantially all of the way along the perimeter of each of the first and second portions of the enclosure;
    a motor operatively connected to the feed distributor to rotate the feed distributor relative to the first and second portions of the enclosure on demand, the feed distributor configured to propel feed as can be provided from the hopper through the gap in substantially all directions from the enclosure when the feed distributor is rotated; and
    a plate secured to the bottom of the second portion for supporting the motor.

13. The animal feeder of claim 12, wherein the second portion of the enclosure comprises an opening for a shaft of the motor connecting the feed distributor.

14. The animal feeder of claim 12, wherein the flange of the first portion of the enclosure comprises an annular flange.

15. The animal feeder of claim 12, wherein the flange of the second portion of the enclosure comprises an annular flange.

16. The animal feeder of claim 12, wherein the first and second portions of the enclosure comprise sheet metal.

17. The animal feeder of claim 12, wherein the motor is provided within a housing.

18. The animal feeder of claim 12, further comprising a motor controller.

19. A method of distributing feed to animals, the method comprising:
    providing the feed to a hopper;
    directing feed from the hopper to a feed distributor enclosed by an enclosure, the feed distributor having a top surface and a bottom surface and being operatively supported to be rotatable relative to the enclosure, the enclosure comprising stationary first and second portions that fully cover the top surface and the bottom surface, respectively, of the feed distributor, the first and second portions of the enclosure each comprising a flange providing an edge that extends along the perimeter of each of the first and second portions of the enclosure, the flange of the first portion of the enclosure spaced from the flange of the second portion of the enclosure defining a gap that extends substantially all of the way along the perimeter of each of the first and second portions of the enclosure; and rotating the feed distributor relative to the first and second portions of the enclosure on demand with a motor supported by a plate secured to the bottom of the second portion, thereby propelling the feed in substantially all directions through the gap.

\* \* \* \* \*